Figure 1:
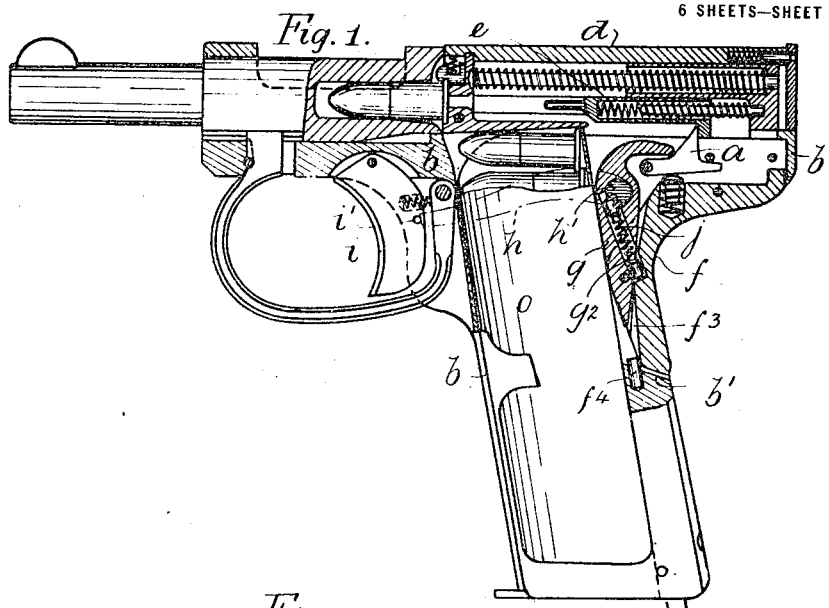

W. J. WHITING.
MAGAZINE SMALL ARM.
APPLICATION FILED JULY 20, 1914.

1,143,471.

Patented June 15, 1915.
6 SHEETS—SHEET 1.

Witnesses

Inventor
William J. Whiting
by
Attorney

W. J. WHITING.
MAGAZINE SMALL ARM.
APPLICATION FILED JULY 20, 1914.
1,143,471.
Patented June 15, 1915.
6 SHEETS—SHEET 2.
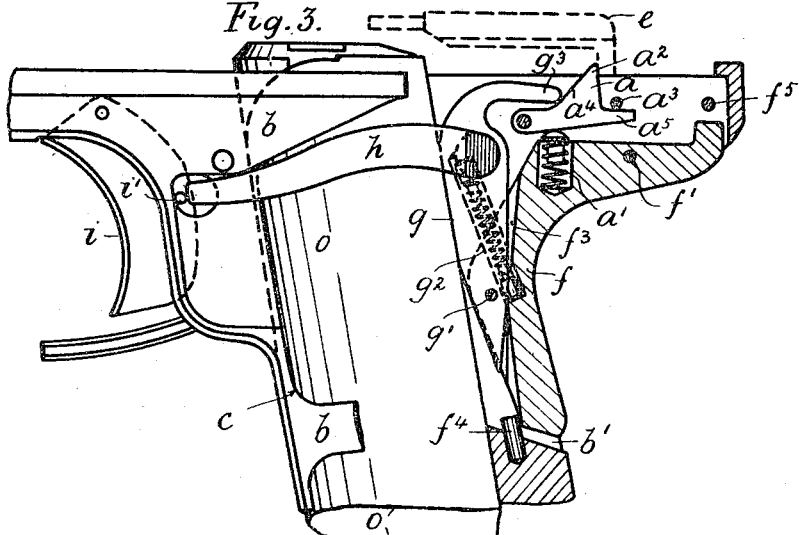
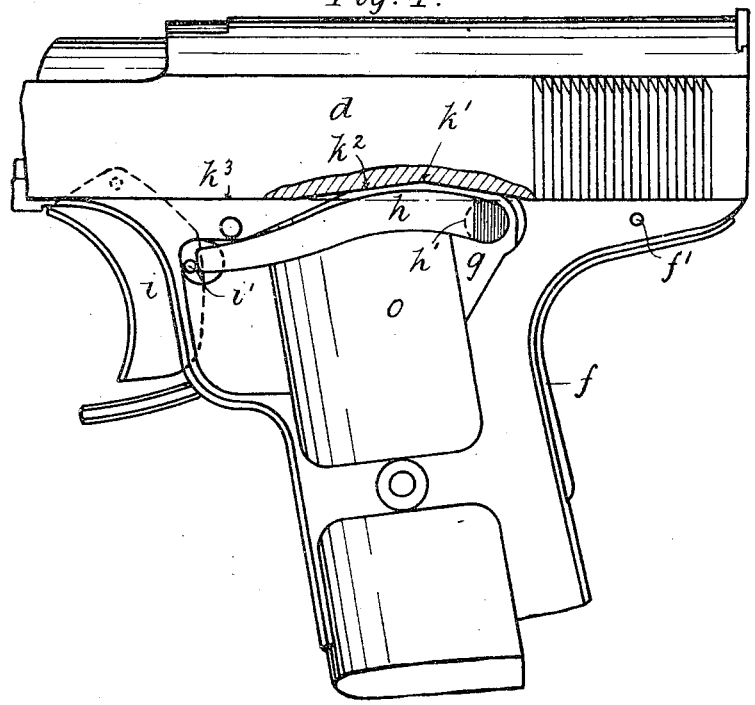
Witnesses
M. E. McHale
Inventor
William J. Whiting
by
James L. Norris
Attorney

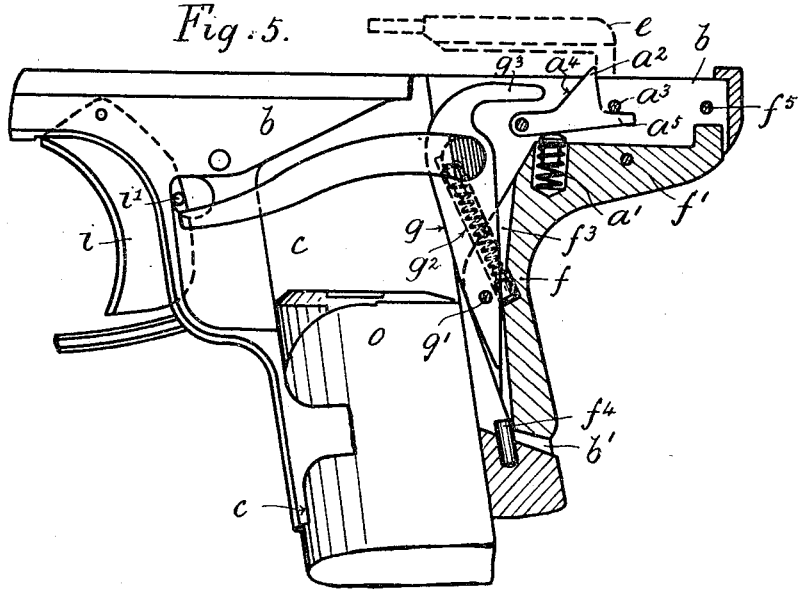
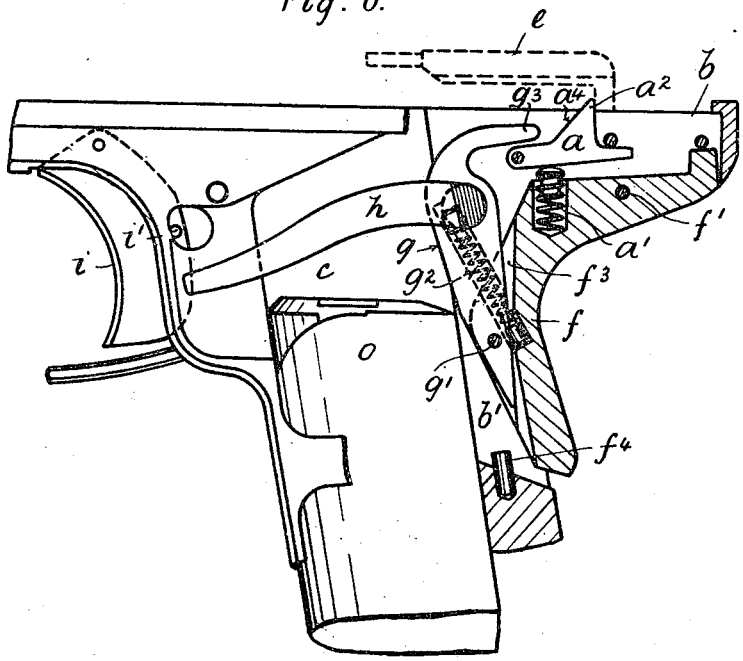

W. J. WHITING.
MAGAZINE SMALL ARM.
APPLICATION FILED JULY 20, 1914.

1,143,471.

Patented June 15, 1915.
6 SHEETS—SHEET 4.

Witnesses:
M. E. McDade

Inventor
William J. Whiting
by James L. Norris
Attorney

W. J. WHITING.
MAGAZINE SMALL ARM.
APPLICATION FILED JULY 20, 1914.
1,143,471.
Patented June 15, 1915.
6 SHEETS—SHEET 6.
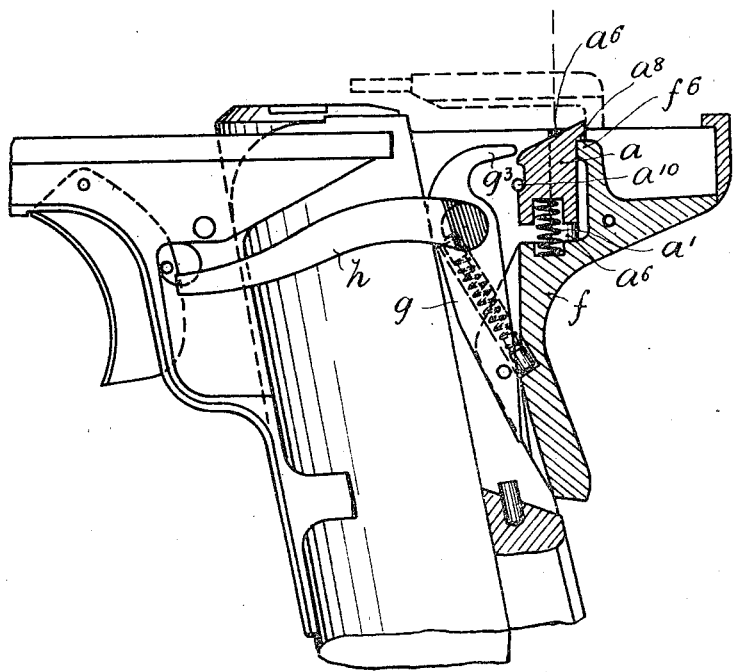
Fig. 12.
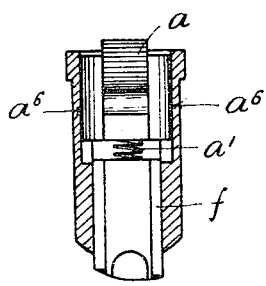
Fig. 12ᴬ
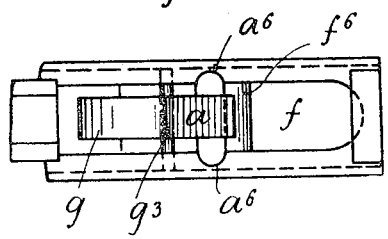
Fig. 12ᴮ
Witnesses:
W. E. McDade
Inventor
William J. Whiting,
by
Amos L. Norris,
Attorney

UNITED STATES PATENT OFFICE.

WILLIAM JOHN WHITING, OF HANDSWORTH, BIRMINGHAM, ENGLAND.

MAGAZINE SMALL-ARM.

1,143,471.

Specification of Letters Patent.

Patented June 15, 1915.

Application filed July 20, 1914. Serial No. 851,996.

*To all whom it may concern:*

Be it known that I, WILLIAM JOHN WHITING, subject of the King of Great Britain, residing at 111 Antrobus road, Handsworth, Birmingham, England, director of public company, have invented certain new and useful Improvements in Magazine Small-Arms, of which the following is a specification.
My invention has reference to firing and safety mechanism for automatic and other small-arms having detachable magazines, and is particularly applicable to automatic pistols of the Webley and similar types in which the trigger is arranged in front of the magazine chamber of the frame while the sear is mounted in the rear of the said chamber and is actuated from the trigger through a firing bar or limb that extends across the side of the said magazine chamber.

The principal object of the said invention is to provide, in connection with the lock or firing mechanism of such small arms, an automatic safety system which renders it impossible for a cartridge to be discharged except when both the magazine is in its proper position and the grip of the arm is properly grasped in the hand for firing, and this object I propose to attain by a dual safety system wherein the operations of the lock are governed by two distinct but interdependent elements, viz. by a hand-controlled element, and a magazine-controlled element, which are associated with one another and with certain members of the lock in such a way that while either of the said elements alone is capable—on being freed of its controlling factor—of automatically and completely disorganizing the said lock, yet both said elements must be positively and simultaneously made ineffective (by the magazine and the shooter's hand respectively) in order to make the lock operative for firing the arm. The invention thus provides an absolutely effective safeguard against an accidental discharge occurring if the arm be grasped and the trigger pulled after a live cartridge has been left in the barrel chamber when the magazine is removed and the hammer or striker of the lock is cocked.

According to the preferred form of my invention, as applied to an automatic pistol of the above-mentioned Webley type, the hand-controlled element of the safety system consists of a spring-influenced grip-lever which is arranged, like an ordinary grip-lever safety, behind or adjacent to the magazine chamber in the stock or grip of the pistol and is made to assume its "firing" position when the said grip is firmly grasped in the hand but automatically resumes its "safe" position when the grasp is relieved, while the magazine-controlled element forms part of the lock or sear-actuating mechanism, and consists of a pivoted limb which is mounted on the said grip-lever and is acted upon by another spring whereby the said limb, when not influenced by the magazine, is held in a "safe" position where it so completely disorganizes the lock that the latter cannot be operated even if the grip lever is manually held in its "firing" position, whereas when a magazine is introduced into the arm, it shifts or displaces the limb and holds the same in such relation to the other parts of the said lock that operative connection between the trigger and the sear is established on the said grip-lever being subsequently moved by hand into the "firing" position.

Figure 2:
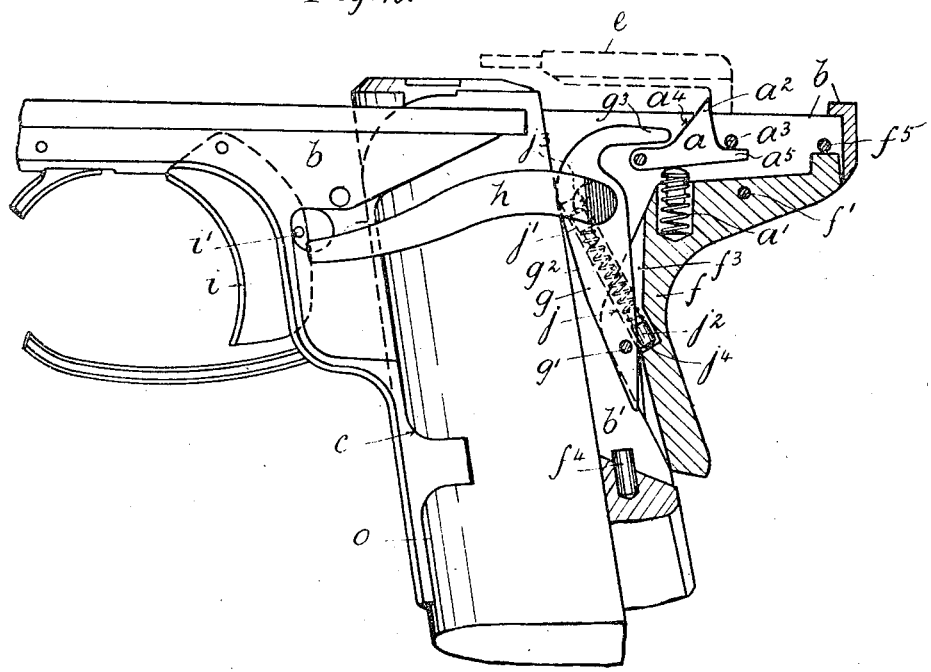

Figure 1 of the accompanying drawings represents a longitudinal vertical section of a hammerless automatic pistol embodying one construction of the dual safety system referred to in the preceding paragraph. This view shows the general arrangement of the lock and safety mechanism, the parts of which are illustrated in the ready-to-fire positions they assume when the magazine is in place and the grip-lever safety is pressed forward by the hand which grasps the stock. Fig. 2 is a view showing the firing and safety mechanism of the pistol on an enlarged scale. This view represents the magazine in place but shows the grip-lever safety in its normal or "safe" position in which it holds the sear-actuating bar of the lock out of engagement with the trigger. Fig. 3 is a similar view to Fig. 2, but showing the parts in the ready-to-fire positions as in Fig.

Figure 7:
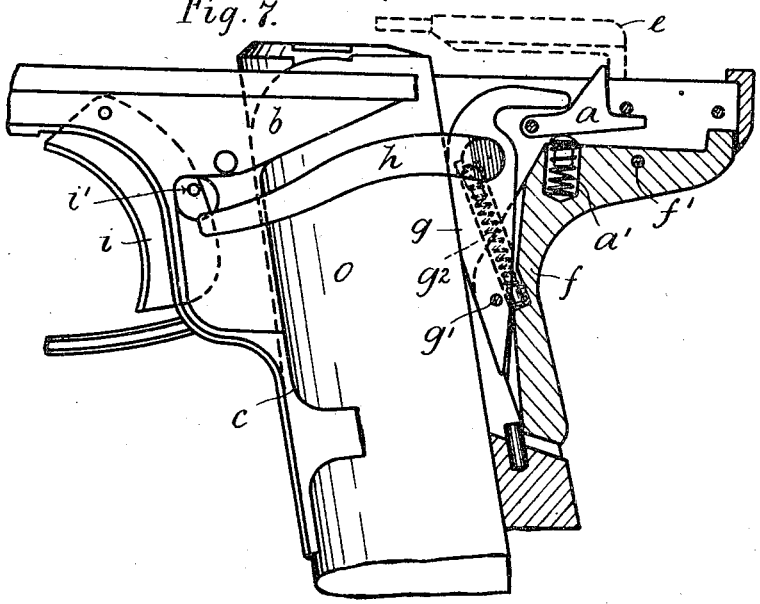
Figure 8:
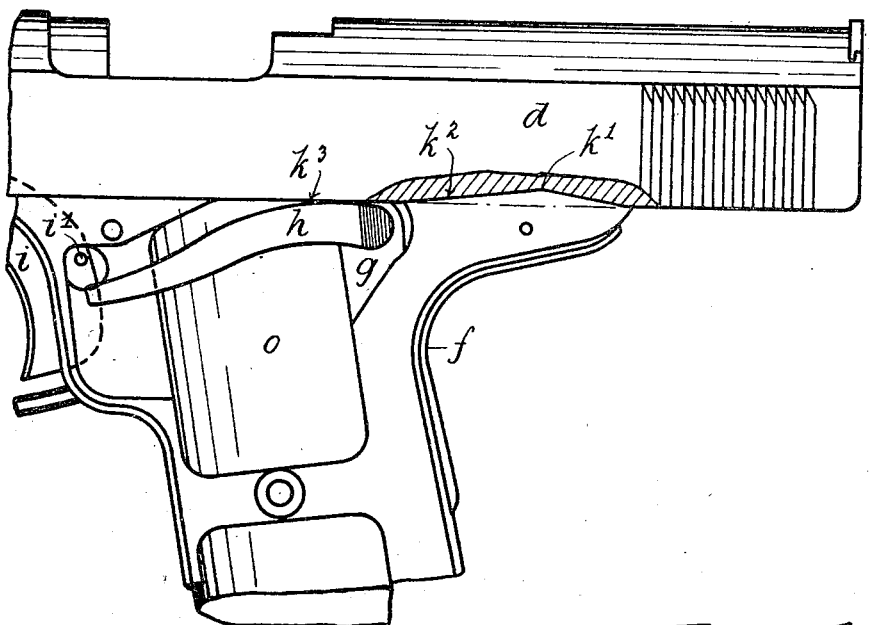
Figure 9:
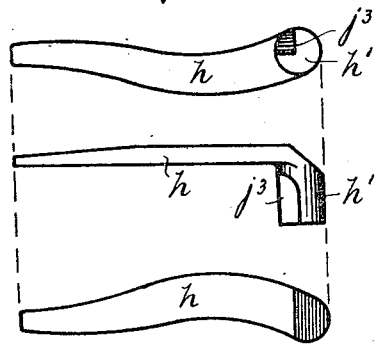
Figure 10:
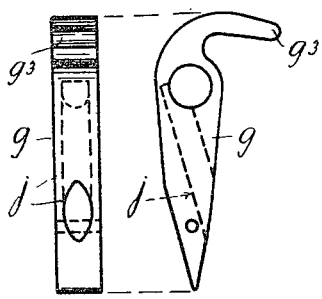
Figure 11:
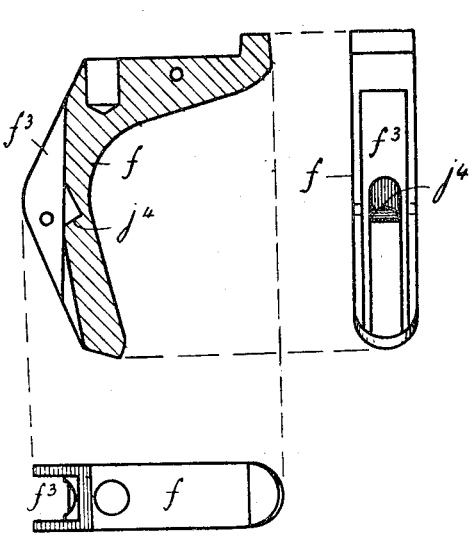

1, where the sear-actuating bar is in operative engagement with the trigger. Fig. 4 is a view, on the same scale as Figs. 2 and 3, but showing part of the breech-sleeve of the pistol, for the purpose of illustrating the position which the sear-actuating bar of the lock assumes relative to a cam on the breech-sleeve when the said bar is in engagement with the trigger as in Figs. 1 and 3. Fig. 5 is another view similar to Figs. 2 and 3 but with the magazine partly withdrawn while the grip-lever safety is in its "firing" position. This view shows how the magazine-controlled safety element alone, or independently of the grip-lever element, automatically disorganizes the lock on the magazine being removed. Fig. 6 is a view showing the positions automatically assumed by the various members of the firing and safety mechanism when the magazine is withdrawn and hand pressure on the grip lever is relieved. Figs. 7 and 8 are views illustrating how the sear-actuating bar is held clear of the trigger by the breech-sleeve during the recoiling and return movements of the latter. In Fig. 7, the striker (shown in dotted lines) is represented as having been cocked, or engaged with the sear of the lock, during the recoiling stroke of the breech-sleeve, while in Fig. 8, the said sleeve is shown at the end of its recoil or cocking stroke. Fig. 9 shows three different views of the sear-actuating bar of the lock separately. Fig. 10 shows side and rear elevations of the magazine-controlled safety element of the lock separately. Fig. 11 shows the grip-lever or hand-controlled safety element separately in vertical section, front elevation and top plan. Fig. 12 is a view similar to Fig. 2 but showing a slightly modified construction of sear and grip-lever. Fig. 12$^a$ is a cross-sectional view showing details of the sear. Fig. 12$^b$ is a top plan view of the rear portion of the frame, showing details of the sear.

The same letters of reference indicate corresponding parts in the several figures of the drawings.

In the pistol shown in said figures, the sear $a$ of the lock is arranged in a horizontal position in the upper part of the frame $b$, at the rear of the magazine chamber $c$, and is influenced by a spring $a^1$ whereby, during the recoil movement of the breech-sleeve $d$ of the arm, the sear nose $a^2$ is engaged with the striker $e$ and retains the latter in its cocked position as represented in Fig. 1. The grip lever $f$, which constitutes the hand-controlled element of the dual safety system, is pivoted (at $f^1$) in an opening $b^1$ leading from the back of the frame into the magazine-chamber $c$, and is normally held by the spring $a^1$ in its "safe" position (see Figs. 2 and 6) in which it partially projects rearwardly beyond the said frame to provide for its displacement into the "firing" position (see Figs. 1, 3, 4, 5, 7 and 8) when the stock or grip of the pistol is grasped in the hand; it being understood that, in the particular construction now being described, the spring $a^1$ serves a double purpose by acting both as a sear-spring and as a grip-lever spring.

The forward side of the grip-lever $f$ registers with the rear upper part of the magazine-chamber $c$ and is formed with a vertical or upright recess or clearance $f^3$ wherein is mounted a magazine-controlled limb $g$, which is adapted to serve as a sear-tripping member of the lock, and also constitutes the magazine-controlled safety element that functions automatically, and independently of the hand-controlled element $f$, to render the lock inoperative when the magazine is withdrawn. This limb is pivoted at $g^1$ in the lower part of the clearance $f^3$ so as to be capable of a limited angular movement relative to the grip-lever, and is acted upon by the spring $g^2$ which tends to rock its upper portion forwardly, i. e. into the magazine-chamber as shown in Figs. 5 and 6, while its upper end is formed with a cam-like rearward extension $g^3$ which, when the mechanism is in the ready-to-fire condition represented in Figs. 1 and 3, bears upon an incline $a^4$ on the top of the pivoted sear $a$. The said limb $g$ has pivoted to its upper part, a sear-actuating bar $h$ which is also under the influence of the double-purpose spring $g^2$ and extends across the side of the magazine chamber; its forward end being held by the said spring $g^2$ in the vicinity of a stud or lateral projection $i^1$ on the trigger $i$. With this arrangement, when the grip-lever is in its normal "safe" position and a magazine $o$ is secured within the magazine-chamber (see Fig. 2) the rear side of the said magazine bears against the upper part of the limb $g$, and compels the latter to assume a position wherein it holds the front end of the sear-actuating bar $h$ below, and out of the range of, the contact stud or projection $i^1$ on the trigger, so that if the said trigger be then pulled, it merely makes an idle movement without touching or engaging the said bar $h$. If, however, the said grip lever is displaced or swung forward by the act of grasping the pistol when the magazine is still in place, the limb $g$ and bar $h$ are shifted into the position shown in Figs. 1 and 3, in which the forward extremity of the said bar comes into direct engagement with the trigger contact, while the cam-extension $g^3$ of the said limb bears upon the sear-incline $a^4$, so that on the trigger being pulled, it acts, through the bar $h$, on the limb $g$ and causes the latter to make a rearward angular movement relative to the grip lever, in the course of which, the cam-projection $g^3$ wipes over the incline $a^4$ and trips the sear out of cocking engagement with the striker $e$ for firing the pistol.

So long as the hand-pressure on the rear safety-lever is maintained to keep the members $g$, $h$ of the lock in the positions above described, the lock mechanism is operable by the trigger for disengaging the sear from the striker after the latter has been cocked or engaged with the said sear during the recoil movement of the breech-slide, while if the grasp is relieved after the firing of any shot, the grip-lever $f$, the magazine-controlled safety limb $g$ and the bar $h$ are immediately and automatically restored to their "safe" position (Fig. 2) by the action of the spring $a^1$. If, however, the magazine $o$ is withdrawn from the pistol when the grip-lever $f$ is in its "safe" position, then, as soon as the rear side of the said magazine has moved clear or out of contact with the upper face of the limb $g$ (see Fig. 6) the latter is, under the action of the spring $g^2$ (which exerts its thrust from a point rearward of the limb-pivot) constrained to tip or fall forward into the magazine-chamber, or to make a definite but limited angular movement relative to the grip lever, which drops the forward end of the sear-actuating bar to such a farther distance below or away from the contact-stud on the trigger (see Fig. 6) that, even if the safety lever is grasped and shifted (to the full extent permitted by the lever stop $f^4$ of the frame) from the "safe" to the "firing" position as shown in Fig. 5, it still cannot raise the bar $h$ into engagement with the trigger-contact $i^1$, and thus the trigger, if pulled, cannot act upon the sear or discharge the pistol. That is to say, although the manual displacement of the safety-lever about its pivot $f^1$ will also forwardly displace the limb $g$ and consequently tilt up the bar $h$ to a certain extent, yet, by reason of the independent downwardly-swinging movement made by the members $g$, $h$, when freed by the removal of the magazine, such displacement is insufficient to bring the forward end of the bar $h$ behind or within the range of the trigger-contact, and thus the lock is still disorganized and the pistol is absolutely unfireable. But on a magazine being pushed back into its chamber, it contacts with, and travels up the front of, the limb $g$ and positively moves the said limb in the rearward direction relatively to the grip-lever $f$ which lifts the sear-actuating bar into the position shown in Fig. 2. Then, when the said magazine is fastened in the pistol, it holds the limb and bar in such positions with respect to the contact-stud of the trigger that any subsequent manual displacement of the grip lever up to its stop $f^4$ will lift the front end of the said bar into engagement or operative relationship with the said trigger-contact, as shown in Figs. 1 and 3.

The upward angular movement of the horizontal sear $a$ under the thrust of the spring $a^1$ is limited by a pin $a^3$ or some other suitable stop which is carried or formed on the frame and is engaged by a rearward extension $a^5$ of the said sear, while another pin or stop $f^5$ is also provided for limiting the rearward angular movement of the hand-controlled safety-lever and for determining the normal or "safe" position in which the said lever shall be held by the said spring $a^1$.

The pivot-pin $h^1$ of the sear-actuating bar $h$ works in a suitable bearing in the upper part of the magazine-controlled limb, and the spring $g^2$ which is common to both the members $g$, $h$, and is located in an inclined hole or recess $j$ cut in the safety limb, has its opposite extremities provided with plungers $j^1$, $j^2$, the upper one being adapted to bear in an angular-sectioned seating $j^3$ cut below and in front of the center of the bar-pivot $h^1$, while the lower plunger has its bearing at $j^4$ behind and below the center of the limb-pivot $g^1$, in the back of the clearance $f^3$ of the lever $f$ wherein the said limb is mounted. This arrangement admits of the sear-actuating bar making a downward angular movement relative to the limb $g$ while the rear side of the seating $j^3$ in the bar-pivot, by reason of its engagement against the upper spring plunger $j^1$, constitutes a stop which holds the said bar in its prescribed normal position relative to the said limb $g$.

In order to provide an arrangement which renders the firing mechanism inoperative, after each discharge, until the breech-sleeve has returned to its closed position and finger pressure on the trigger has been relieved, the sear-actuating bar is formed with a curved upper edge which (when the magazine is in place and the grip-lever is shifted into its firing position wherein the front end of the said bar engages behind the trigger contact) lies partly within a cam-ended recess or clearance $k^1$ in the side of the recoiling breech sleeve $d$ as shown in Fig. 4, so that when the pistol is discharged and the breech-sleeve starts to recoil along the frame, the cam end $k^2$ of the recess will travel over the curved edge of the bar and rock the latter, in opposition to its pivot spring, in the downward direction for temporarily disengaging the front of the said bar from the trigger contact, as shown in Fig. 7. A straight or unrecessed edge or surface $k^3$ of the breech sleeve then comes over and rides along the bar (see Fig. 8) and functions to positively hold the latter in its depressed position, clear of the trigger-contact, until the said sleeve has completed its recoil and return movements, whereupon the breech-sleeve recess $k^1$ comes again over the pivot end of the sear-actuating bar, so that, when finger-pressure on the trigger is relieved and after the said trigger has been taken back by its spring to its normal position, the pivot-spring may function to lift the bar and reëngage its front-end behind the trigger contact-stud, whereupon the firing mechanism is again effective for firing the next shot.

I wish it to be understood that my invention is not limited to the particular form of construction of mechanism shown in the above-described drawings but includes any other arrangement in which a limb or member adapted to transmit movement from the trigger to a sear or cocking device is mounted on or associated with a hand-controlled grip-lever or safety device and is controlled, as regards its relationship with the trigger, by means of a magazine in such a manner that when said magazine is removed the lock is completely and automatically disorganized or put out of gear and can only be restored to its operative position by the act of gripping the hand-controlled safety element after the magazine has been restored to its place in the arm.

Again, instead of using a horizontally-disposed rocking sear such as shown in Figs. 1 to 11 of the drawings, I may employ a sear arrangement such as is illustrated in Figs. 12, 12$^A$ and 12$^B$, wherein the spring-lifted sear $a$ is fitted in, and is designed to make a vertical sliding or rise-and-fall movement, in guides $a^6$ cut inside in the frame and is adapted to be depressed, or disengaged from the striker, when the limb $g$ (whose cam end $g^3$ bears on top of the said sear) is moved rearwardly upon the bar $h$ being actuated by the trigger. The upward movement of the sear is limited by a stop $a^{10}$ carried by the frame, while in the arrangement illustrated, the rear of the said sear is provided with a shoulder $a^8$ which normally, or when the lever $f$ is in its safe position, is engaged by an extension $f^6$ of the said lever. The sear thus takes the place of the pin $f^5$ shown in Figs. 1 to 7 for determining the position in which the safety-lever $f$ shall be held by the pressure of the double-purpose spring $a^1$ when the said lever is not gripped in the hand.

Instead of the limb $g$ being adapted to effect the disengagement of a rocking or sliding sear in the manner herein described, the same may be made to transmit the striker-releasing movement to the said sear in any other manner, or through any other suitable form of connection, which will allow the sear to move independently of the said limb during the rearward stroke of the breech sleeve of the arm to admit of the striker traveling into cocking engagement with the sear nose.

The improved dual-control safety system herein described in connection with a hammerless automatic pistol may also be applied, without necessitating any substantial modification or variation, to automatic pistols of the hammer type, and to pistols and small arms generally where a detachable magazine is employed.

Having described my invention, what I claim and desire to secure by Letters Patent is:—

1. In a dual automatic safety system for magazine small arms, a hand-controlled safety element consisting of a spring-influenced grip-lever and a spring-influenced and magazine-controlled limb associated with said grip-lever and constituting part of the lock mechanism, for transmitting motion from the trigger to the sear of the lock, said limb upon the magazine being removed, or hand-pressure on the grip lever being relieved, automatically assuming a position that renders the lock inoperative.

2. In a magazine pistol: the combination with a spring-influenced grip-lever safety which is arranged behind or adjacent to the magazine chamber, of a spring-influenced limb which forms part of, or is connected with, the lock mechanism of the pistol and is pivotally mounted on the said grip-lever; the said limb being so arranged that it partly lies within or extends into the said magazine chamber to permit of the same being controlled by the magazine, substantially in the manner and for the purpose herein set forth.

3. In a dual automatic safety system for magazine small arms embodying a sear and a trigger, in combination, a hand-controlled safety element consisting of a spring-influenced grip-lever, a spring-influenced and magazine-controlled limb associated with said grip-lever and constituting part of the lock mechanism, a spring held bar forming an operative connection between said trigger and limb for transmitting motion from the former to the latter, the said limb acting upon the sear when operated by said trigger and upon the removal of the magazine or the release of hand pressure on the grip-lever automatically assuming a position in which said bar is inoperative as a connection between the same and said trigger.

4. In a dual automatic safety system for magazine small arms embodying a sear and a trigger, in combination, a hand-controlled safety element consisting of a spring-influenced grip-lever, a spring-influenced and magazine-controlled limb associated with said grip-lever and constituting part of the lock mechanism, a spring held bar pivotally connected to said limb and forming an operative connection between said trigger and limb for transmitting motion from the former to the latter, the said limb acting upon the sear when operated by said trigger and upon the removal of the magazine or the release of hand pressure on the grip-lever automatically assuming a position in which said bar is inoperative as a connection between the same and said trigger.

In testimony whereof I have hereunto set my hand in presence of two subscribing witnesses.

WILLIAM JOHN WHITING.

Witnesses:
ARTHUR SADLER,
E. J. REESE.